United States Patent [19]

Westphal et al.

[11] 4,319,232
[45] Mar. 9, 1982

[54] LIQUID LEAKAGE DETECTOR

[76] Inventors: Frank C. Westphal, 522 Summerset Ct., Indian Harbour Beach, Fla. 32937; Raymond G. Olson, 2 Sinclair Cir., Indialantic, Fla. 32903

[21] Appl. No.: 131,754

[22] Filed: Mar. 19, 1980

[51] Int. Cl.³ ............................................. G08B 21/00
[52] U.S. Cl. .................. 340/604; 174/70 R; 174/117 R; 340/605
[58] Field of Search ............... 340/602, 603, 604, 605, 340/620; 174/70 R, 117; 4/427, DIG. 15, 300

[56] References Cited

U.S. PATENT DOCUMENTS

| | | | |
|---|---|---|---|
| 3,098,116 | 7/1963 | Jore et al. | 340/604 X |
| 3,294,893 | 12/1966 | Shaffer | 174/70 R |
| 3,366,854 | 1/1968 | Robinson | 174/70 R X |
| 3,498,131 | 3/1970 | Rickey | 340/620 X |
| 3,696,362 | 10/1972 | Sieron | 340/620 |
| 3,732,556 | 5/1973 | Caprillo et al. | 340/620 |
| 3,757,316 | 9/1973 | Florenzo | 340/620 X |
| 3,864,676 | 2/1975 | Macias et al. | 340/604 |
| 4,020,478 | 4/1977 | Hatfield | 340/604 |
| 4,041,557 | 8/1977 | Ringler | 4/427 |
| 4,126,857 | 11/1978 | Lancia et al. | 340/605 X |

Primary Examiner—John W. Caldwell, Sr.
Assistant Examiner—Daniel Myer

[57] ABSTRACT

A liquid detection device for energizing a warning signal. An electronic switch, of the non-latching type, is provided for coupling a source of electrical energy to a warning device responsive to a first signal at the inputs thereof. An elongated probe is provided having at least two generally parallel conductors enclosed in an insulative sheath having a plurality of apertures therein for exposing adjacent sections of the conductor. The conductors are coupled to the inputs of the electronic switching device for generating the first signal responsive to moisture being operatively coupled over the apertures between the conductors. The probe is of sufficient length in order to form a perimeter about the area in which the liquid is to be detected.

13 Claims, 5 Drawing Figures

LIQUID LEAKAGE DETECTOR

BACKGROUND OF THE INVENTION (I) Field of the Invention

The present invention relates to a warning system of the type used for sensing the leakage of a liquid from a storage tank, transport conduit, etc.

(II) Description of the Prior Art

There are great numbers of situations where water or other fluids are stored in the household or in industrial applications where it is extremely important to monitor the integrity of the storage vessel or transport system. For example, it is important for the homeowner to have an early warning sounded as soon as his waterbed begins to leak. Similar early warnings are helpful when water begins to leak from water heaters, washing machines, dishwashers, air conditioning evaporators, air conditioning water supplies, troublesome plumbing systems, etc. When leaks of this type occur at locations which are not often observed by the homeowner, an extended period of leakage can cause substantial damage to carpeting, flooring, etc. When an early warning signal is provided, it may be possible to correct and repair the leak before substantial damage occurs and before the vessel or transport device becomes unserviceable.

It is also helpful to have a sensing and warning device which is portable and which contains its own power supply so that when an intermittent leak is discovered and repaired, the portable device may be located adjacent to the leak on a temporary basis in order to warn the occupant if the repairs on the vessel or transport system have been unsuccessful. It is also helpful to have a self-contained power supply for the unit under circumstances such as severe storms and flooding conditions so that the alarm may be sounded even when the normal sources of electrical power have been disrupted. While the use of a self-contained power supply is functionally desirable, the use of a battery requires that any circuitry provided with the system have an extremely low current drain in the quiescent mode so that the battery will not have to be replaced frequently. Shock hazards to human life should be eliminated. Even though the sensor and warning device comes in contact with a liquid, the device should not become a potential safety hazard because of the self-contained low voltage power supply.

It is also desirable to provide an elongated probe or sensor which is coupled to the electronics of the liquid leakage detector system so that the probe may be placed around the base of the storage vessel or along the length of the transport conduit. A perimeter sensor of this type is preferred because it will provide an early warning signal without the necessity of allowing the fluid to flow to the extreme where it makes contact with the remotely located sensor. The elongated probe moisture sensor must be inexpensive to manufacture as well as being reliable in its operation. The elongated probe also must be suitable for operation in applications requiring an extended length and must not impose any requirements to change the sensing circuitry to accommodate the extended length.

Various prior art devices have attempted to solve this problem without apparent success. Fenole, in U.S. Pat. No. 4,069,817, discloses a body waste detecting device of the type designed for incontinent patient. The device includes an elongated flexible strip arranged to be positioned beneath the patient in a wheelchair or bed. This strip includes two conductive paths printed on the sensor so as to be electrically bridged by body waste materials, such as urine, in order to decrease the resistance between the two paths. Detecting circuitry is provided for energizing a visual alarm indicative of the patient requiring assistance. This device is typically unsuitable for long-term applications due to the substantial quiescent current drawn by the biopolar transistor utilized in the circuitry. Furthermore, the form of the elongated moisture probe requires the use of expensive manufacturing techniques which are contrary to the purpose of the present invention. Also, the form of the elongated probe as disclosed by Fenole does not easily allow the extension of the length of the probe without replacing the entire length of the probe.

Gustafson, in U.S. Pat. No. 3,824,460, discloses the use of an improved capacitive sensing system adapted for use in detecting the presence of a liquid. A sensing probe comprises a pair of increased parallel wires having spaced webs which are formed from extensions of the wire casing. The probe is typically attached to and held flat on the floor over a considerable length so that leakage anywhere along the probe will result in a change in the capacitance between the two conductors which may be sensed by appropriate circuitry of the type designed to sound a suitable alarm. This type of probe requires the use of relatively expensive electronics which are not normally suitable for use with long-lasting battery power sources. Furthermore, the additional capacitance which would be added to the oscillator circuit by the addition of extra lengths of the sensing probe could be detrimental to the operating efficiency and reliability of the device. Also, capacitive changes which can normally occur without the occurrence of a leak may provide additional failure modes for incorrect leakage indications. For example, if a person steps upon the capacitive sensing probe, the additional capacitance of the body tissues adjacent to the parallel conductors may often indicate the presence of a fluid in an otherwise dry area.

Kullberg, in U.S. Pat. No. 4,136,823, discloses a sensing element having the form of a pair of conductors separated by an insulating material which absorbs moisture and thereby reduces the resistance between the conductors. This reduced resistance causes a conduction through the sensor which in turn closes a relay for sounding an alarm. The moisture absorption property of the insulation material provides only marginal operation in the presence of high ambient humidity conditions. In addition, the absorption property of the insulator imposes a requirement to either replace or dry out the material after it has been subjected to excessive moisture.

Freise, in U.S. Pat. No. 3,521,791, discloses a leakage sensor of the type adapted to be used with beverage dispensing devices. A pair of isolated electrodes are located within the beverage dispensing conduit. When the fluid flows through the adjacent sections of the dispensing conduit, the sensing circuit is closed, thereby indicating the presence of fluid within the conduit. A device of this type is usually employed as a "go-no go" flow sensor and would not be suitable for the detection of small amounts of moisture or liquid as is required in the present application.

Shuman, in U.S. Pat. No. 3,778,570, discloses a flat pad having a plurality of parallel electrically conductive sensor strips thereon. A fluid which is deposited upon the pad will bridge the insulative substrate between the conductive strips in order to complete the circuit.

Rauchwerger, in U.S. Pat. No. 3,771,548, discloses a capacitive moisture control system having a peak detector. The system utilizes an ultra-sonic oscillator which transmits a signal into the probes which function as variable capacitors depending upon the moisture content of the adjacent soil. This circuitry disclosed by Rauchwerger includes SCR devices for controlling valves which are coupled to the fluid supplies. The SCR devices are not utilized for sensing the presence of the moisture, but are utilized for energizing the relays and other similar power applications.

The applicants are also aware of several competing products which are presently available on the market. The first competing device is manufactured by Dorlen Products Co., 7224 W. Layton Ave., Greenfield, Wis. 53220, which is sold under the trademark WATER ALERT. This is a water detection device which sounds an audio alarm when water forms a conductive path between point contacts located on the bottom of the case. Provisions are included for a remote indicator lamp and the control of a shut-off device. The alarm will automatically reset when water is removed from the sensor. However, the sensor is not suitable for being placed on an irregularly shaped surface. Also, the electronics of this device are quite complex in that an integrated circuit chip and two separate transistors are required. The exact circuit and its functions are unknown.

Northern Electric Co. of 5224 Kedzie Ave., Chicago, Ill. 60625, a division of the Sunbeam Corporation, markets a device under the tradename WATER ALARM. This device sounds an audible alarm when water forms a conductive path between two point contacts on the bottom of the case. There are no provisions for remote indicators, lamps or control of shut-off devices. This unit does not provide a linear sensor. The unit does not automatically reset the audible alarm after water is removed from between the point contacts. The unit does not include a sensor of the type which would be suitable for use on an irregular surface. The electronics of the device are complex since at least one integrated circuit and various other components are required. The exact construction and operation of the circuitry is presently unknown.

Another competing device is marketed by the Retawmatic Corp. of Box 460, Grand Central Station, New York, N.Y. 10017, under the tradename SURFACE WATER DETECTOR. This unit is a combination electrical and mechanical water detection device. The unit includes an expandable cartridge which changes its physical dimensions by swelling when in contact with water. The resulting mechanical motion of the expanding cartridge is detected to physically close the contact switch. This unit does not include a linear liquid sensor nor any type of sensor which would be suitable for use on an irregularly shaped surface. The audible alarm is optional and does not reset when the moisture is removed. The electronics of the device are unknown.

The following patent references are disclosed as a result of a preliminary search, but it is not believed these references add anything to the prior art already cited:

U.S. Pat. Nos. 3,882,382, 3,802,456, 3,531,264, 3,127,485, 2,166,481, 2,687,721, 2,668,202, 3,530,855 and 3,493,951.

SUMMARY OF THE INVENTION

The present invention relates to a liquid leak detection device which employs the bistable state property of a silicon controlled rectifier (SCR) in order to energize a warning device responsive to sensing a low impedance across the conductors of a liquid sensing probe. The sensing probe includes at least two conductors which are spaced from each other by an insulator and are coupled to a bistable state control input of the SCR. The insulating material generally surrounds the conductors and includes a plurality of aperatures therein which expose the associated conductors for allowing the errant liquid to form a low impedance bridge therebetween.

BRIEF DESCRIPTION OF THE DRAWINGS

Other objects, features and advantages of the present invention will be apparent through a study of the written description and the drawings in which.

Figure 1:
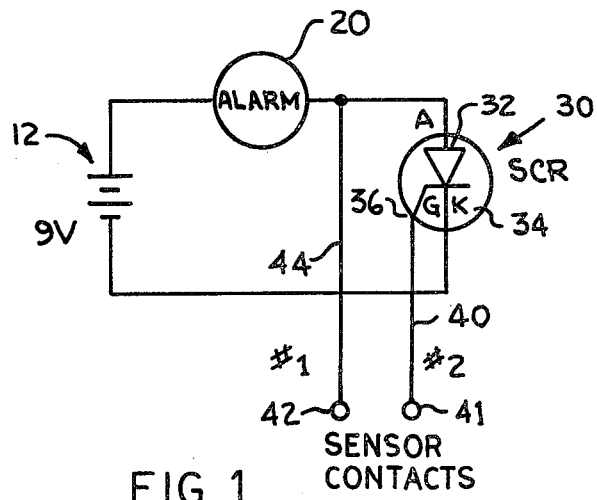
FIG. 1 illustrates a schematic block diagram of an electronic circuit in accordance with the present invention.

In the drawings, like reference characters will refer to like parts throughout the several views of each of the embodiments of the present invention. However, variations and modifications may be effected without departing from the spirit and scope of the concepts of the disclosure as defined by the appended claims. Other specific forms and constructions of the invention will be equivalent to the embodiments described although departing somewhat from the exact appearance of the drawings.

DETAILED DESCRIPTION OF THE PREFERRED EMBODIMENT

A first preferred embodiment of the liquid sensing system is illustrated in FIG. 1. The system includes an electronics sub-system and a sensing sub-system. The system utilizes a typical zinc-carbon storage battery 12 which is connected in series with an audible alarm 20, which in turn is connected in series with a SCR semiconductor device, shown generally as 30.

The main purpose of the audible alarm system 20 is to make the owner aware that a fault mode has developed indicating the presence of an errant liquid and that appropriate action should be taken as soon as possible.

The audible alarm 20 generally comprises a commercially available buzzer (audio sub-system). Systems of this type are quite well known and various types of these systems may be substituted without affecting the operation of the system.

While the term audible alarm has been utilized, it will be apparent that in some particular applications it may be necessary to utilize a visual warning signal to complement the audible alarm signal, or in the alternative to substitute the visual alarm in place of the audible alarm in situations where it is undesirable to have an audible alarm signal. The audible alarm 20 may also include an integral relay for closing contacts in order to energize remotely located circuitry as required in the specific application. Examples of applications for this type of control circuitry include closing fluid control valves, turning on lights, transmitting remote alarms, actuating process control systems, etc.

Special consideration has been given to the selection of the specific type of SCR for the preferred embodiment. The requirement for the operation of the subject device are specific with respect to the need for low supply current (low SCR anode or principal current) and high sensitivity control (low SCR gate current). Inherent in the physical construction of the typical "low current SCR," which satisfies these requirements, is the characteristic where the required latching anode current is significantly greater than the anode holding current. This characteristic does not exist in other current rating classes of SCR's.

In classes of SCR's other than this "low current SCR" class, that is where the latching SCR anode current and the holding SCR anode current are nearly equal, the SCR anode current must be removed in order to cause the conducting SCR to return to its non-conducting state. In the case of the "low current SCR" class, the conducting SCR device automatically returns to the non-conducting state when the gate control signal is removed. This "automatic reset" freature has been employed in the preferred embodiment. As a result, no reset switch is used.

Proper selection of circuit components for the preferred embodiment (i.e., impedance of the audio alarm) maintains the SCR anode current at a level which is less than the latching current. This allows the "automatic reset" feature to be employed which results in a less complex circuit than is taught in the prior art. Typical "low current SCR's" exhibit this unexpected and unique characteristic and generally can be used interchangeably in the preferred embodiment.

With specific reference to FIG. 1, an SCR device 30 is coupled in series with the audible alarm 20 and the battery 12 as illustrated in FIG. 1. While the term "SCR" is used herein, it will be apparent to one skilled in the art that depending upon the particular requirements of the specific application, various other members of the thyristor family, which include the triac, and the diac, may also be utilized.

As illustrated in FIG. 1, the SCR anode 32 is coupled through the audible alarm 20 to the positive side of the battery, while the SCR cathode 34 is coupled to the negative side of the battery. The SCR gate 36 is coupled through a circuit conductor 40 to a first sensing contact 41 which will be described subsequently. Also, the circuit conductor which couples the alarm 20 to the SCR anode 32 is coupled to a second circuit conductor 44 which in turn is coupled to a second sensing contact 42.

Figure 2:
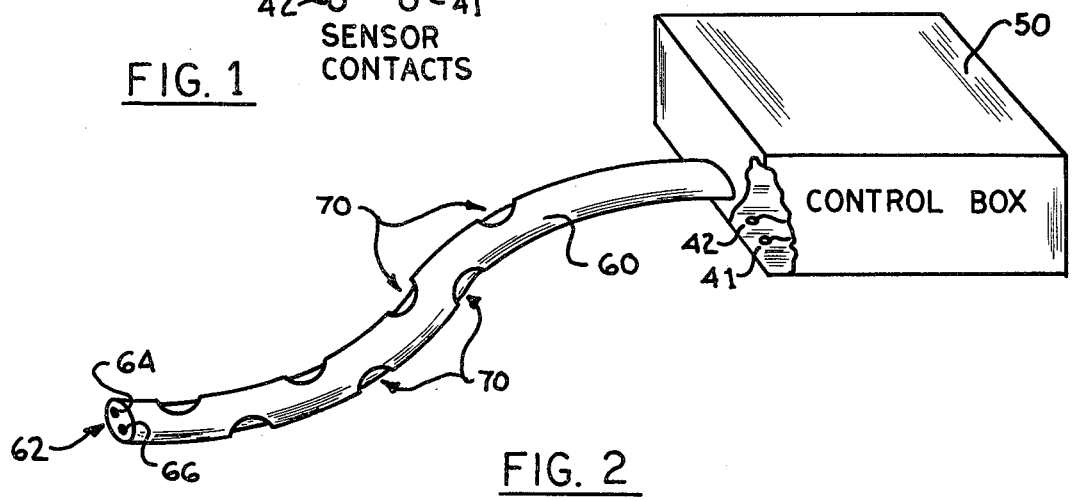
FIG. 2 illustrates a preferred embodiment of the elongated liquid sensing probe in accordance with the present invention.

In the first preferred embodiment of the present invention a perimeter sensor, shown generally as 60 in FIG. 2, is electrically coupled to the circuit conductors 40 and 44. The perimeter sensor 60 typically is formed from a dual conductor electrical cable having conductors arranged in a parallel fashion and mechanically and electrically separated from each other by an insulating sheath. While the present invention envisions the use of a dual conductor wire, it may be possible and in many cases desirable to utilize a multi-conductor cable having three, four or more conductors in situations where multiple fault areas are to be sensed by one or more electronic systems previously described. A non-absorbent material is preferred for the insulating sheath.

With continuing reference to FIG. 2, the perimeter sensor 60 includes a first electrical conductor 64 and a second electrical conductor 66. Typically these conductors are coupled to the circuit conductors 44 and 40 as previously described. The electrical conductors 64 and 66 are separated by an insulator 62 which generally surrounds the entire circumference of the conductors. At various intervals along the length of the insulating sheath 62 the conductors are exposed by creating notches 70 in the insulating sheath 62. While FIG. 2 illustrates that the notches 70 alternate between the first electrical conductor 64 and then the second electrical conductor 66, it is usually not critical to the operation of the circuitry of the present invention as to the exact location of each of these notches. The particular application of the liquid sensing system will determine the maximum separation distance between the notches 70 in the insulating sheath 62 for opposing circuit conductors 64 and 66. For example, if the particular application requires the sensing of relatively large fluid bodies, the opposing notches 70 should be separated by relatively large distances. However, if maximum sensitivity is required or if it is desirable to sense mere droplets of liquid, the relatively close spacing of opposing notches 70 will be required.

The primary advantage of the perimeter sensor 60 as illustrated in FIG. 2 is the low manufacturing cost and the high reliability of the finished product. For example, one preferred embodiment of the present invention utilizes an ordinary electrical "zip cord" as the perimeter sensor 60.

One advantage of the perimeter sensor 60 is that the flexible electrical conductors may be laid along irregular surfaces around the perimeter of liquid storage tanks, liquid conduits, etc. The electrical properties of the sensing circuit disclosed herein are such that extremely long lengths of the perimeter sensor 60 may be utilized without adversely affecting the performance of the liquid sensing system as herein described.

Figure 3:
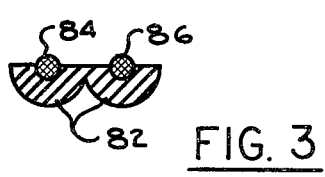
FIG. 3 illustrates a cross sectional view of a second preferred embodiment of the liquid sensing probe.

A second preferred embodiment of the perimeter sensor is illustrated generally as 80 in FIG. 3. This second embodiment of the perimeter sensor includes a first electrical conductor 84 and a second electrical conductor 86 which are partially covered by an insulating sheath 82. As contrasted with the first preferred embodiment of the insulating sheath 62 as shown in FIG. 2, the second preferred embodiment has the insulating sheath 82 completely covering the lower surfaces of the first and second electrical conductors 84 and 86 respectively, with the upper surfaces of the conductors being bare. In this manner when the errant liquid flows over the perimeter sensor 80, it will cause a low impedance path to bridge between the first and second electrical conductors 84 and 86. It is envisioned that this second embodiment of the perimeter sensor 80 would be continuous in that the upper surfaces of the conductors 84 and 86 would be continuously exposed. However, it may be desirable under certain applications to alternately expose first the top surfaces and then the bottom surfaces of the conductors 84 and 86 along the longitudinal direction of the perimeter sensor 80.

Figure 4:
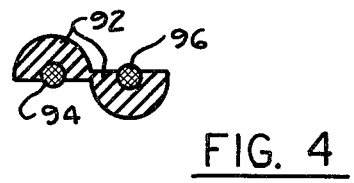
FIG. 4 illustrates a cross sectional view of a third preferred embodiment of the liquid sensing probe.

A third preferred embodiment of the perimeter sensor is shown generally as 90 in FIG. 4. In this embodiment the first electrical conductor 94 and the second electrical conductor 96 are partially covered by an insulating sheath 92. As contrasted with the other embodiments, the insulating sheath 92 exposes either the upper or lower surface of one of the electrical conductors (either 94 or 96), but then exposes the opposite surface (either the upper or lower surface) of the adjacent electrical conductor 96. As illustrated in FIG. 4, the first electrical conductor 94 is covered on the upper surface thereof by the insulating sheath 92, while the lower surface thereof is exposed for contact with the errant liquid. The second electrical conductor 96 is covered on the lower surface thereof by the insulating sheath 92, while the upper surface thereof is not covered. While it is envisioned that this third preferred embodiment 90 of the perimeter sensor would maintain this opposing upper and lower insulating arrangement, it may be advisable according to the specific application in question to alternate the placing of the insulating along the conductors so that one conductor is insulated along the lower surface for a certain length, and then it becomes insulated upon the upper surface thereof for an additional length.

While the first preferred embodiment of the present invention utilizes a remote liquid sensor, it is possible and in fact many cases preferable to utilize a pair of liquid sensing contacts located immediately upon the control box 50 (see FIG. 2) which houses the previously described circuit elements. Under these circumstances the first sensing contact 41 and the second sensing contact 42 would be located on the underneath side of the control box 50 in order to sense the presence of any moisture or liquid at the earliest possible time. These sensing contacts 41 and 42 would typically be located adjacent to each other but separated by some electrically insulative material so that a lower resistance bridge would be formed between the contacts when the errant liquid is present.

In some cases it may be desirable to couple which perimeter sensor 60 directly to the first and second sensing contacts 41 and 42. Under these circumstances the sensing contacts could have the form of an insulated rivet of the type having a central bore therein. The perimeter sensor 60 could then be coupled to the sensing contacts 41 and 42 through the use of a connector which would communicate through the central bore or in some other fashion make electrical and mechanical contact with the sensing contacts 41 and 42. Notwithstanding this construction, it may be desirable to attach the perimeter sensor 60 in a fashion so that the first and second sensing contacts 41 and 42 are not disabled.

The moisture sensing system as disclosed herein may be located adjacent to any area in which liquid sensing is required. The errant liquid will collect on the surface of the insulating sheath 62 and, when present in sufficient quantities, will electrically bridge the insulating sheath 62 to cause a relatively low resistance path to occur between generally adjacent notches 70 in the insulating sheath 62 covering the first and second electrical conductors, 64 and 66 respectively. The resultant low resistant path between conductors 64 and 66 allows the SCR gate 36 to be connected to the SCR anode 32 for providing a source of gate triggering current and voltage. The resulting forward bias of the SCR gate 36 with respect to the SCR cathode 34 causes conduction to exist from the SCR anode 32 to the SCR cathode 34. This conduction completes the circuit between the battery 12 and the audio alarm 20 which results in a warning which is an indication of the detection of a leaking liquid. Removal of the SCR triggering signal from the SCR gate 36 to SCR anode 32, removes the forward bias of the SCR gate 36 to SCR cathode 34 junction and thus conduction of the SCR device ceases. In the absence of anode current, the audio alarm 20 will be disabled.

Figure 5:
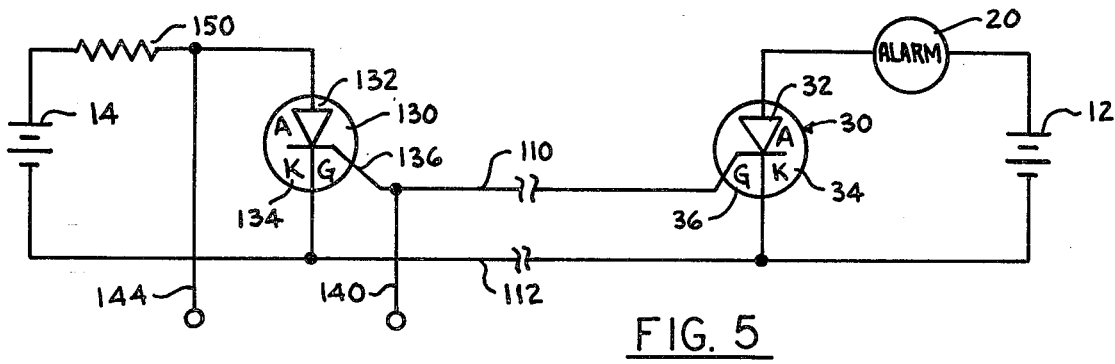
FIG. 5 illustrates a schematic block diagram of an alternate electronic circuit in accordance with another preferred embodiment of the present invention.

An alternate embodiment of the present invention is illustrated generally in FIG. 5. This alternate embodiment includes a first storage battery 12, an audible alarm 20 and a first SCR or trigger device 30 having an anode 32, a cathode 34 and a gate 36. The gate 36 of the first SCR device 30 is coupled to the gate 136 of a second SCR device 130 which also includes an anode 132 and a cathode 134. A load resistance 150 is coupled in series between the anode 132 and a second or alternate storage battery 14. The first circuit conductor 144 is coupled to the anode 132 of the second SCR device 130 and a second circuit conductor 140 is coupled to the gate 136. In FIG. 5 the circuit conductor 110 which couples the gates 136 and 36 together with the ground return element 112 for each of the circuits has been illustrated as being of an elongated length in order that the alarm system may be physically displaced from the sensor. That is, when the perimeter sensor 60 is coupled between the first conductor 144 and the second conductor 140, the second SCR 130 becomes the sensor for actuating the first SCR 30.

When the second SCR 130 begins to conduct between the anode 132 and the cathode 134, the gate 136 is at a positive potential with respect to ground. Therefore, if this gate 136 is coupled through circuit conductor 110 to the gate 136 of the first SCR 30 a sufficient voltage potential difference will exist between the gate 36 and the cathode 34 of the first SCR 30 in order to cause sufficient gate current to be applied from the second SCR 130 to the first SCR 30. This additional gate current will cause the first SCR 30 to conduct. The advantage of this type of circuit is that the gate current transmitted through the circuit conductor 110 to the gate 36 of the first SCR 30 will be on the order of 200 microamperes. This extremely low current may be used to actuate another low current-high impedance device such as the SCR 30 and to activate a solenoid or shut-off valve which can be substituted for the alarm 20.

It should be understood at this point that the present invention should not be limited in its application to the construction details in the illustrated parts in the accompanying drawings, since this invention is capable of being practiced or constructed in a variety of other embodiments. Also, it must be understood that the terminology and descriptions employed herein are used solely for the purpose of describing the preferred embodiments and should not be construed as limitations on the operability of the invention.

We claim:

1. A liquid detection device comprising in combination:

a thyristor device having control inputs and having outputs coupled to a source of electrical energy and to a warning device for energizing said warning device responsive to a first signal at said control inputs thereof;

a second thyristor device having control inputs and having at least one output coupled to a corresponding one of said control inputs of said first thyristor device for retransmitting said first signal received at said control inputs thereof; and probe means comprising at least two conductors coupled to said control inputs of said second thyristor device and spaced from each other by an insulator, said probe means for generating said first signal responsive to a liquid operatively bridging at least two of said conductors.

2. The liquid detection device as described in claim 1 wherein said two conductors comprise a first contact point and a second contact point located upon an insulative plate, with said insulative plate forming a lower external section of an enclosure for the liquid detection device.

3. The liquid detection device as described in claim 1 wherein said conductors of said probe means are elongated and generally parallel with each other and are encased in an insulative sheath having a plurality of notches therein for exposing adjacent sections of said conductors therethrough.

4. The liquid detection device as described in claim 3 wherein said notches in said insulative sheath are positioned in juxtaposed pairs so as to expose adjacent sections of said first and said second conductors, thereby reducing the quantity of the liquid required to bridge adjacent notches.

5. The liquid detection device as described in claim 4 wherein said notches are located within opposing outside surfaces of said insulative sheath.

6. The liquid detection device as described in claim 5 wherein said notches adjacent said first conductor are interleaved with said notches adjacent said second conductor.

7. The liquid detection device as described in claim 3 wherein said first and said second conductors are each at least three feet long and are separated from each other by approximately 0.25 inches.

8. The liquid detection device as described in claim 3 wherein said probe means is flexible for conforming to irregularly shaped supporting surfaces.

9. The liquid detection device as described in claim 3 wherein at least one of said notches is generally coextensive along an extended length of an upper surface of said insulative sheath covering both of said conductors of said probe means.

10. The liquid detection device as described in claim 3 wherein at least one of said notches is generally coextensive along an extended length of an upper surface of said insulating sheath covering one of said conductors, while another one of said notches is generally coextensive along an extended length of a lower surface of an insulating sheath covering the other one of said conductors of said probe means.

11. The liquid detection device as described in claim 1 wherein said thyristor device is an SCR of the low current classification in which the current through said outputs is enabled responsive to a principal current at said control inputs which is less than a level of current at said control inputs required to electrically latch said outputs.

12. A liquid detection device as described in claim 1 wherein the current conducted through said outputs of said thyristor device immediately returns to an off-state condition responsive to said first signal being removed from said control inputs.

13. The liquid detection device as described in claim 12 wherein said off-state current through said outputs of said thyristor device is typically less than 100 microamperes.

* * * * *